US011485591B2

(12) United States Patent
Kalavathi et al.

(10) Patent No.: US 11,485,591 B2
(45) Date of Patent: Nov. 1, 2022

(54) DOCK SEAL SYSTEM

(71) Applicant: Nova Technology International, LLC, Menomonee Falls, WI (US)

(72) Inventors: Sunil Kalavathi, Sheboygan, WI (US); Todd A. Mervin, Brookfield, WI (US); Robert J. Hensel, Germantown, WI (US)

(73) Assignee: NOVA TECHNOLOGY INTERNATIONAL, LLC, Menomonee Falls, WI (US)

( * ) Notice: Subject to any disclaimer, the term of this patent is extended or adjusted under 35 U.S.C. 154(b) by 23 days.

(21) Appl. No.: 17/205,884

(22) Filed: Mar. 18, 2021

(65) Prior Publication Data

US 2022/0127088 A1 Apr. 28, 2022

Related U.S. Application Data

(60) Provisional application No. 63/104,601, filed on Oct. 23, 2020.

(51) Int. Cl.
*B65G 69/00* (2006.01)
*B32B 5/20* (2006.01)

(52) U.S. Cl.
CPC ............. *B65G 69/008* (2013.01); *B32B 5/20* (2013.01); *B65G 69/001* (2013.01)

(58) Field of Classification Search
CPC ... B65G 69/008; B65G 69/001; E04F 19/026; E04F 19/028; B32B 5/20
USPC ........................... 52/173.2, 2.12, 273, 309.4
See application file for complete search history.

(56) References Cited

U.S. PATENT DOCUMENTS

| | | | | |
|---|---|---|---|---|
| 3,181,205 A | * | 5/1965 | Frommelt | B65G 69/008 49/462 |
| 3,935,684 A | * | 2/1976 | Frommelt | B65G 69/008 135/115 |
| 4,574,542 A | * | 3/1986 | Kleynjans | B65G 69/008 160/151 |
| 4,601,142 A | * | 7/1986 | Frommelt | B65G 69/008 52/173.2 |
| 4,825,607 A | | 5/1989 | Frommelt et al. | |
| 5,333,424 A | * | 8/1994 | Chalfant | B65G 69/008 49/493.1 |
| 6,073,402 A | * | 6/2000 | Moody | B65G 69/008 5/709 |
| 7,383,664 B2 | | 6/2008 | Chalfant | |
| 8,112,949 B2 | | 2/2012 | Eungard | |
| 8,181,401 B2 | * | 5/2012 | Eungard | B65G 69/008 52/173.1 |

(Continued)

FOREIGN PATENT DOCUMENTS

| | | | | |
|---|---|---|---|---|
| DE | 2927233 A1 | | 1/1981 | |
| DE | 4030255 A1 | * | 3/1992 | B65G 69/008 |

(Continued)

*Primary Examiner* — Brent W Herring
(74) *Attorney, Agent, or Firm* — Erin Ella Block; DeWitt LLP

(57) ABSTRACT

The present invention is a dock seal system for mounting on a structure wall. The system includes at least one side seal made up of a backer board having a hollow configuration and a foam seal attached to the backer board. A first side of at least one wear pleat is removably connected to the foam seal by at least one pleat fastener. This allows rapid, easy replacement of worn-out wear pleats.

20 Claims, 4 Drawing Sheets

(56) References Cited

U.S. PATENT DOCUMENTS

| | | | |
|---|---|---|---|
| 8,991,113 B2 | 3/2015 | Metz | |
| 2002/0112418 A1* | 8/2002 | Thill | B65G 69/008 52/173.2 |
| 2002/0148177 A1 | 10/2002 | DiBiase | |
| 2006/0090407 A1* | 5/2006 | Hoffmann | E06B 3/80 52/173.2 |
| 2009/0178349 A1* | 7/2009 | Schmidt | B65G 69/008 14/71.1 |
| 2016/0083203 A1* | 3/2016 | Mueller | B65G 69/008 52/741.3 |
| 2016/0280478 A1* | 9/2016 | Gleason | B65G 69/008 |
| 2018/0029810 A1* | 2/2018 | Gleason | B65G 69/003 |
| 2019/0039841 A1* | 2/2019 | Duffy | F16F 1/377 |

FOREIGN PATENT DOCUMENTS

| | | | | |
|---|---|---|---|---|
| GB | 2312915 A | * | 11/1997 | B65G 69/008 |
| WO | WO-0078653 A1 | * | 12/2000 | B65G 69/008 |

* cited by examiner

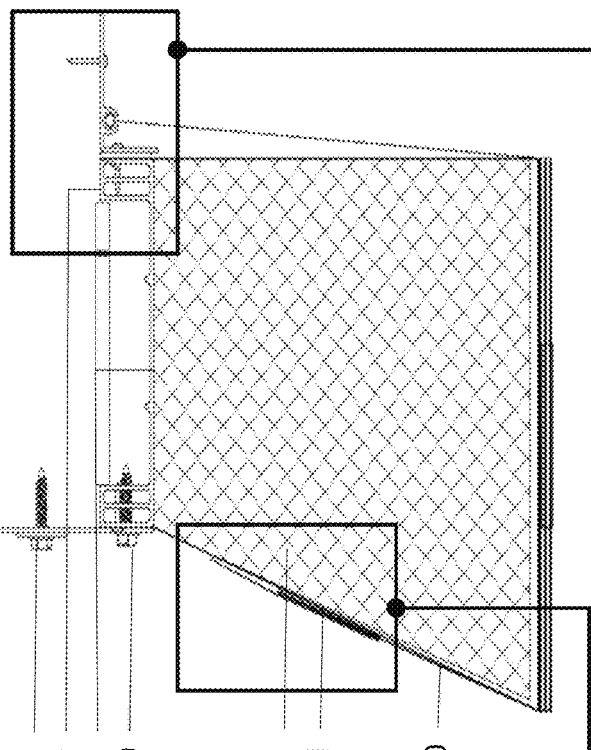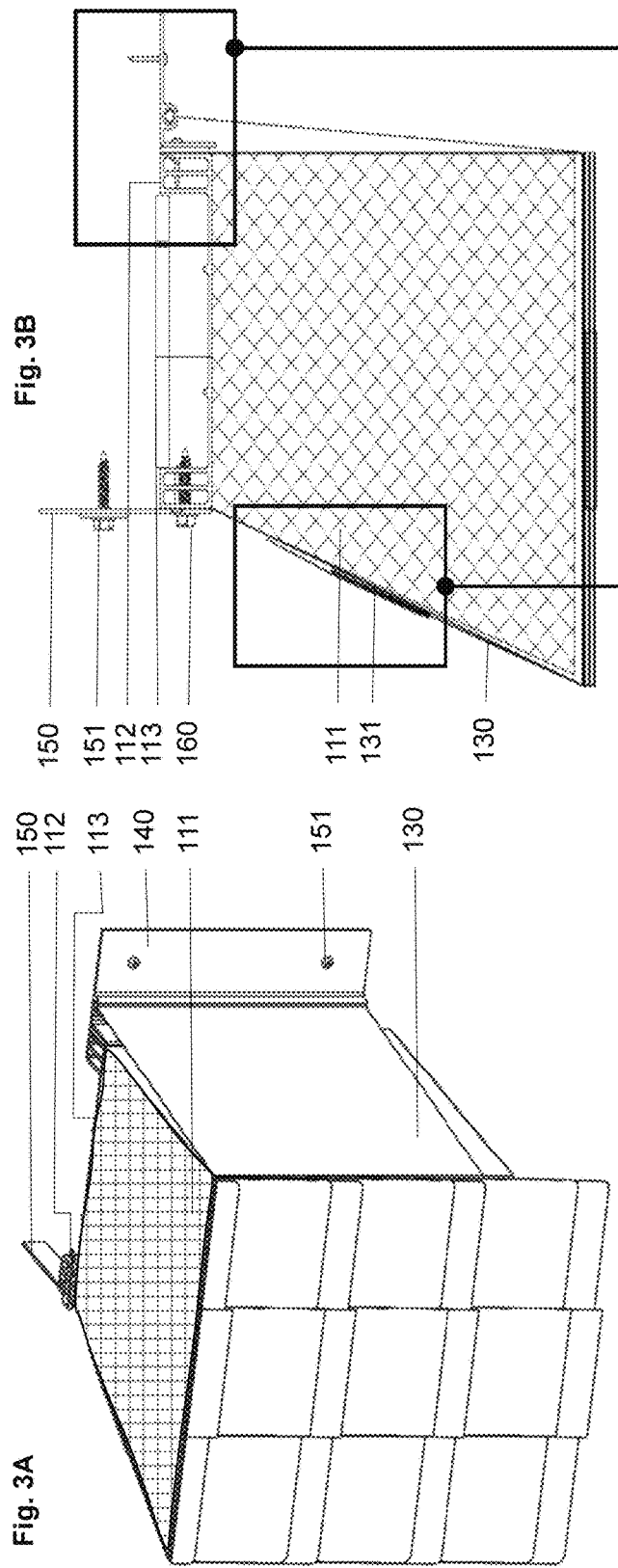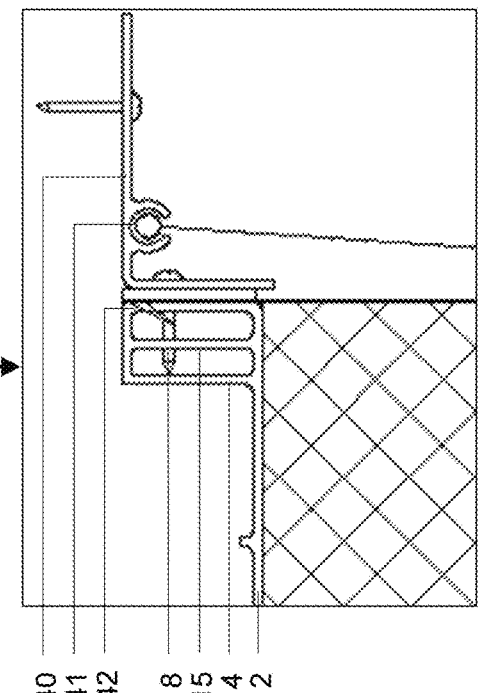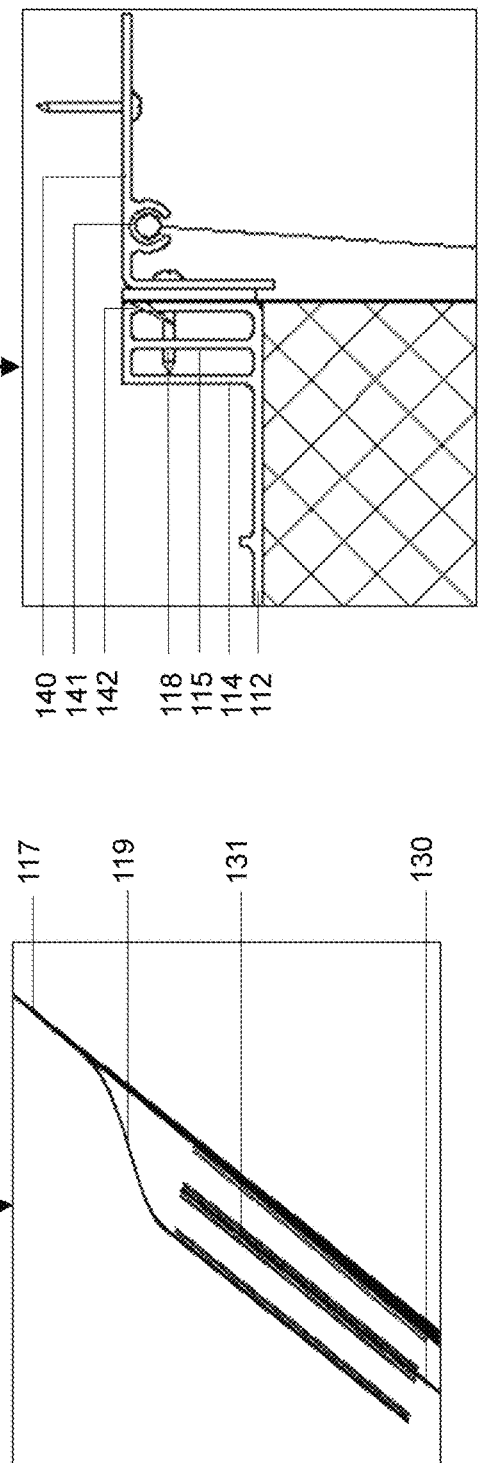

DOCK SEAL SYSTEM

CROSS-REFERENCE TO RELATED APPLICATIONS

This application claims the benefit of prior-filed, U.S. Provisional Patent Application No. 63/104,601, filed on Oct. 23, 2020, the contents of which are incorporated herein by reference in their entirety.

BACKGROUND OF THE INVENTION

The present disclosure is directed to a loading dock system, and more specifically to a system for sealing a vehicle trailer to the dock structure.

In modern loading docks, vehicle trailers back up to an entrance opening in the structure to allow loading and unloading of goods. To prevent damage to the trailer and/or structure, most drivers will leave a small gap between the trailer and structure. Such gaps allow entrance of wind and water, which can damage goods being unloaded from the trailer or create hazardous conditions in the loading dock or trailer. These gaps waste energy used in heating and cooling the structure and may also allow elements of the goods or unloading vehicle to be caught in the gap and potentially be damaged or cause an accident. The gap may also cause injuries if workers are caught in the gap.

Modern dock sealing systems are used to prevent such gaps between loading docks and vehicle trailers. Pleats may be attached to seals to prevent wear to the sealing portions of the system. Unfortunately, when the pleats and/or other portions of the sealing systems become damaged, the entire system must be removed and replaced. Because many systems have heavy, unitary components, the replacement process takes a significant amount of time, requires multiple workers, and results in wastage of undamaged components.

There is an unmet need in the art for a dock seal system which allows rapid, easy replacement of portions of the system.

BRIEF SUMMARY

The present invention is a dock seal system for mounting on a structure wall. The system includes at least one side seal made up of a backer board having a hollow configuration and a foam seal attached to the backer board. At least one L-shaped bracket is removably connected to a second side of the backer board and permanently connected to the structural wall. A first side of at least one wear pleat is removably connected to the foam seal by at least one pleat fastener.

BRIEF DESCRIPTION OF THE DRAWING(S)

FIGS. 3A, 3B, 3C, and 3D are front perspective, top, exploded enlarged partial, and enlarged partial views, respectively, of a cross-section of a portion of the dock seal system.

Figure 1:
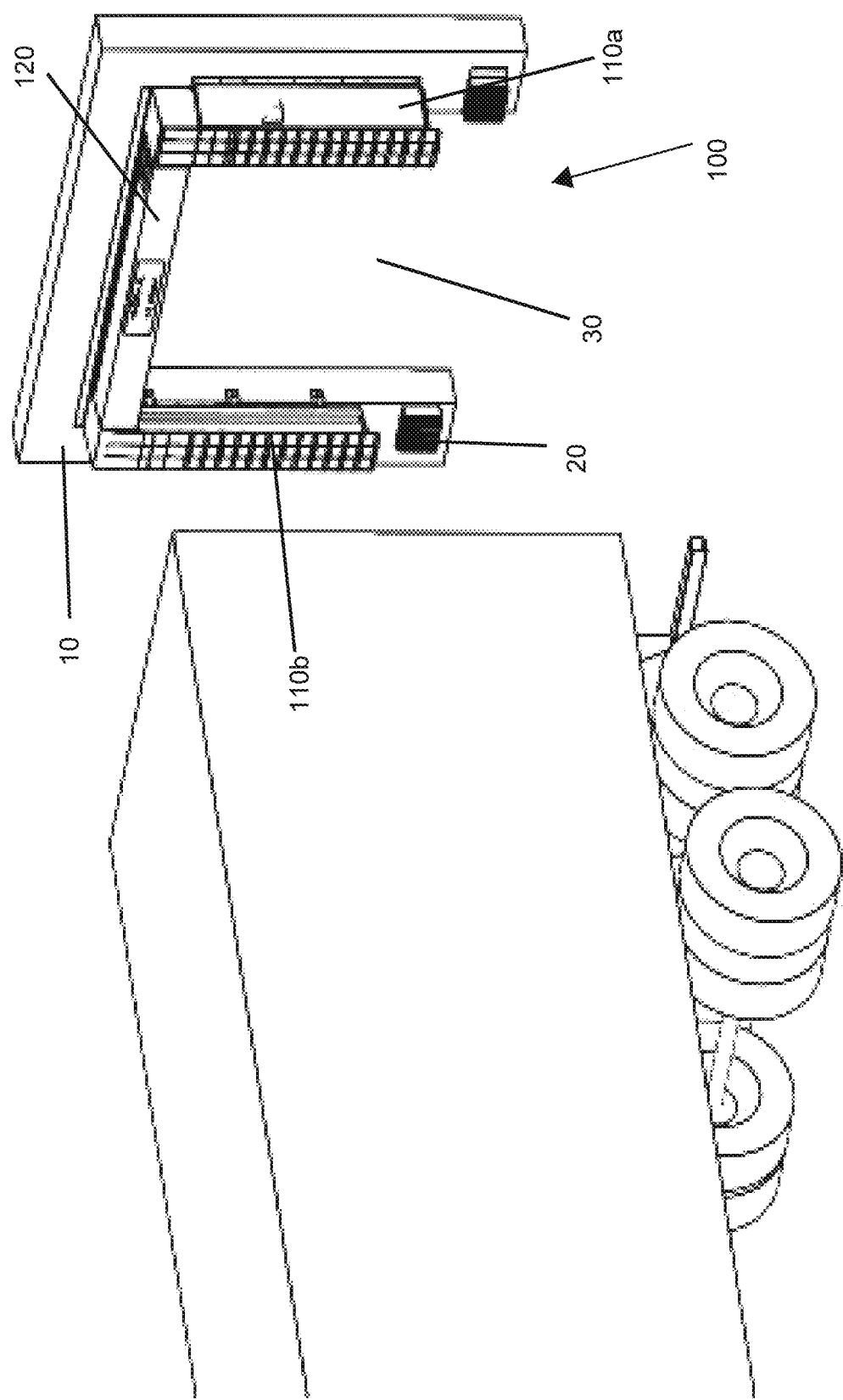
FIG. 1 is a front perspective view of a dock seal system installed on a structure.
Figure 2B:
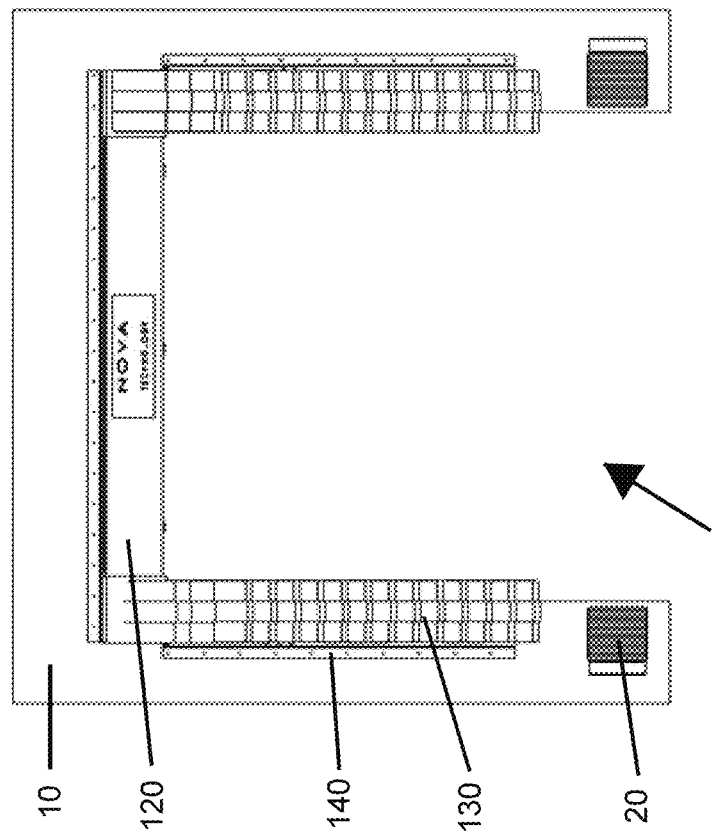
FIGS. 2A and 2B are front perspective and front views, respectively, of the dock seal system.
Figure 2A:
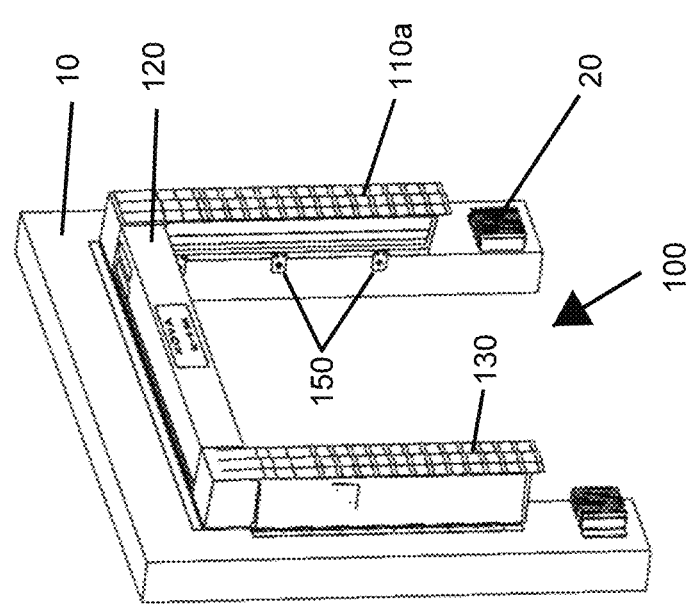
Figure 4B:
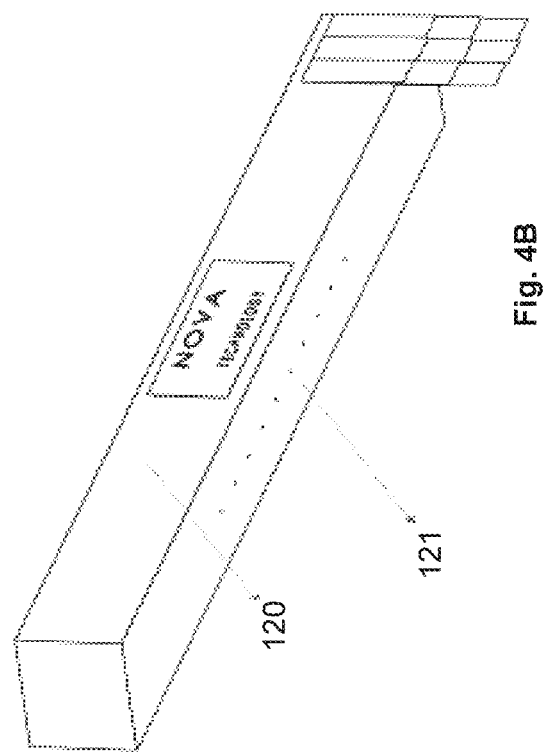
Figure 4A:
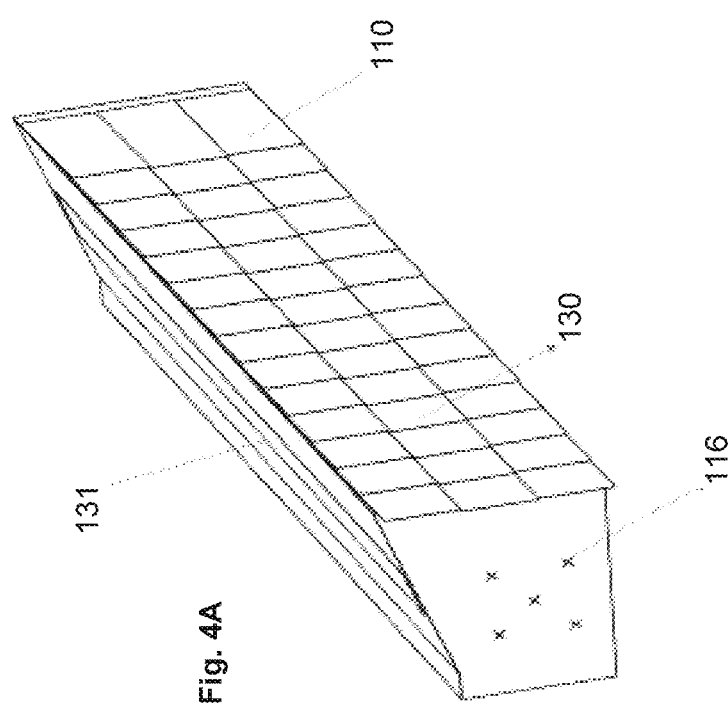

FIGS. 4A and 4B are bottom perspective views of a side pad and a head pad, respectively, of the dock seal system.

It should be understood that for clarity, not every part is labeled in every drawing. Lack of labeling should not be interpreted as a lack of disclosure.

DETAILED DESCRIPTION OF THE INVENTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

The dock seal system 100 is mounted to a structure wall 10 above trailer bumpers 20 and surrounds an entrance 30. The dock seal system 100 includes two side seals 110a and 110b flanking the entrance 30, with a head seal 120 above the entrance 30. As a result, the dock seal system 100 has an upside-down U-shaped configuration. The side seal 110b is a mirror of the side seal 110a and contains the same elements.

The side seal 110a includes a deformable foam seal 111 adhesively bonded to a backer board 112. The backer board 112 has a hollow, substantially U-shaped cross-sectional structure and is manufactured from a polymer-based material for ease of handling during production and installation and to prevent warping during use. In certain embodiments, the polymer-based material is a lightweight material and/or includes reinforcing material making it a composite. Due to the consistent flatness of the backer board 112 the dock seal system 100 does not form any gaps once the foam seal 111 is compressed. The open side of the hollow board channel 113 of the backer board 112 faces the structure wall 10, allowing water to remain against the structure wall 10 and not infiltrate the foam seal 111. If water does enter the foam seal 111, the board channel 113 of the backer board 112 allows it to drain due to gravity from the inside. The channel walls 114 on either side of the board channel 113 are also hollow to reduce weight and material. In the embodiment shown in FIG. 3D, the channel walls 114 also include reinforcing partitions 115 which further helps in securing the base fabric 117 of the foam seal 111 by better engaging the fabric anchors 118.

The foam seal 111 has a trapezoidal cross-section. The foam seal 111 also includes an air circulation system of strategically placed air vents 116 replacing conventional grommets on the bottom portion of the foam seal 111. The air vents 116 may be configured as X-shaped or similar cuts in the base fabric 117 of foam seal 111. The foam seal 111 is covered in a sheet of base fabric 117 which is held in place by means of fabric anchors 118 extending through the base fabric 117 and through the channel walls 114. In the embodiment shown in FIG. 3D, the fabric anchors 118 are screws. Certain embodiments also include a scuff guard 119 attached to the side of the foam seal 111 adjacent the entrance 30. The scuff guard 119 provides additional protection to the base fabric 117.

Removable and replaceable wear pleats 130 cover at least part of the peripheral surface of the foam seal 111. The wear pleats 130 have a unique foldable design to allow compression for easy storage and shipping. The wear pleats 130 are connected to the foam seal 111 by means of at least one pleat fastener 131 on a first side of the wear pleats 130 adjacent to the entrance 30. In the embodiment shown in FIG. 3C, the pleat fastener 131 is double-sided hook-and-loop fastener. The pleat fastener 131 also helps to avoid tearing the base fabric 117 off of the foam seal 111 due to vehicles scratching and rubbing against the side seals 110a and 110b during loading and unloading the trailer.

The second side of the wear pleats 130 is secured to an L-shaped bracket 140 by means of a pleat retaining channel 141. The second side of the wear pleats 130 may be slidably inserted into and removed from the pleat retaining channel 141 to facilitate replacement of the wear pleats 130. A first leg of the L-shaped bracket 140 extends parallel to and is permanently attached to the structure wall 10. This first leg is caulked to seal it to the structure wall 10 and prevent ingress of water. The pleat retaining channel 141 also extends along the outer surface of the first leg. A second leg of the L-shaped bracket 140 extends perpendicularly to the structure wall 10.

The L-shaped bracket 140 serves as a permanent install on the structure wall 10 for reuse when replacing the foam seal 111 and/or wear pleats 130. This reduces replacement cost due to re-caulking and allows for all parts to be easily replaceable and attached to the permanently installed L-shaped bracket 140. The sliding capability of the pleat retaining channel 141 allows new wear pleats 130 to be installed quickly, wrapping the wear pleats 130 around the foam seal 111 to the pleat fastener 131 on the other side.

A weather seal gasket 142 inserted between the L-shaped bracket 140 and the backer board 112 to keep the connection weathertight, as shown in FIG. 3D, providing better sealing between the foam seal 111 and the backer board 112. These measures prevent water from being absorbed into the foam seal 111 from the sides or an irregular surface on structure wall 10.

A plurality of wall mounting brackets 150 extend along the structural wall 10 adjacent to the entrance 30, anchored by wall mounting anchors 151. A plurality of removable board anchors 160 extend through the wall mounting brackets 150 and into the channel wall 114 adjacent the entrance to anchor the backer board 112 in place.

The head seal 120 also includes a deformable foam seal 111 adhesively bonded to a backer board 112. If water enters the foam seal 111, a water drainage system of strategically placed water drains 121 replaces conventional grommets in the base fabric 117 of foam seal 111. The water drains 121 may be configured as circular or similar shaped cuts in the base fabric 117 of foam seal 111.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

We claim:

1. A dock seal system for mounting on a structure wall, comprising:
   at least one side seal comprising a backer board having a hollow configuration and a foam seal attached to the backer board;
   at least one L-shaped bracket removably connected to a second side of the backer board and permanently connected to the structural wall, wherein the L-shaped bracket essentially consists of a first plane connected at a bend to a second plane; and
   at least one wear pleat, wherein a first side of the at least one wear pleat is removably connected to the foam seal by at least one pleat fastener.

2. The system of claim 1 wherein the backer board has a U-shaped cross-section comprising a first channel wall on a first side of a board channel and a second channel wall on a second side of the board channel.

3. The system of claim 2 wherein the first channel wall and the second channel wall have hollow cross-sections.

4. The system of claim 2 wherein the first channel wall and the second channel wall have hollow cross-sections with reinforcing partitions extending through the hollow cross-sections.

5. The system of claim 2 wherein an open side of the board channel faces a surface of the structure wall.

6. The system of claim 2 further comprising at least one wall mounting bracket removably connected to the first channel wall and to the structural wall.

7. The system of claim 6 further comprising at least one removable board anchor extending through the at least one wall mounting bracket and into the channel wall.

8. The system of claim 1 wherein a second side of the at least one wear pleat is slidably connected to a pleat retaining channel on the L-shaped bracket.

9. The system of claim 1 further comprising a weather seal gasket forming a seal between the L-shaped bracket and the backer board.

10. The system of claim 1 further comprising caulking forming a seal between the L-shaped bracket and the structural wall.

11. The system of claim 1 further comprising a sheet of base fabric extending over the foam seal from a first side of the backer board to a second side of the backer board.

12. The system of claim 11 further comprising at least a first fabric anchor extending through the sheet of base fabric and into the first side of the backer board and at least a second fabric anchor extending through the sheet of base fabric and into the second side of the backer board.

13. The system of claim 1 wherein the backer board is manufactured from a polymer-based material.

14. The system of claim 1 further comprising a plurality of air vents extending through a base fabric covering the foam seal.

15. The system of claim 1 wherein the at least one pleat fastener is a hook and loop fastener.

16. The system of claim 1 wherein the wear pleats comprise replaceable and foldable wear pleats.

17. The system of claim 1 further comprising a second side seal, the second side seal comprising a second backer board having a hollow configuration and a second foam seal attached to the second backer board.

18. The system of claim 17 further comprising a second L-shaped bracket permanently connected to the structural wall and removably connected to a second side of the second backer board.

19. The system of claim 17 further comprising a head seal, the head seal comprising a third backer board having a hollow configuration and a third foam seal attached to the third backer board.

20. The system of claim 19, wherein the third foam seal comprises at least one water drain extending through a base fabric covering the third foam seal.

* * * * *